(12) United States Patent
Lim et al.

(10) Patent No.: US 9,927,662 B2
(45) Date of Patent: Mar. 27, 2018

(54) LIQUID CRYSTAL DISPLAY HAVING IMPROVED CURING CHARACTERISTICS

(71) Applicant: Samsung Display Co., Ltd., Yongin-si, Gyeonggi-do (KR)

(72) Inventors: Tae Woo Lim, Yongin-si (KR); Seong Gyu Kwon, Suwon-si (KR); Choi Sang Park, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 15/419,572

(22) Filed: Jan. 30, 2017

(65) Prior Publication Data

US 2017/0235169 A1    Aug. 17, 2017

(30) Foreign Application Priority Data

Feb. 15, 2016    (KR) .................. 10-2016-0017147

(51) Int. Cl.
| | | |
|---|---|---|
| G02F 1/1333 | (2006.01) | |
| G02F 1/1341 | (2006.01) | |
| G02F 1/1335 | (2006.01) | |
| G02F 1/1343 | (2006.01) | |
| G02F 1/1362 | (2006.01) | |
| G02F 1/1368 | (2006.01) | |

(52) U.S. Cl.
CPC .......... *G02F 1/1341* (2013.01); *G02F 1/1368* (2013.01); *G02F 1/133345* (2013.01); *G02F 1/133377* (2013.01); *G02F 1/133514* (2013.01); *G02F 1/134309* (2013.01); *G02F 1/136209* (2013.01); *G02F 1/136286* (2013.01); *G02F 2001/133519* (2013.01); *G02F 2201/123* (2013.01)

(58) Field of Classification Search
CPC ...................................................... G02F 1/1334
See application file for complete search history.

(56) References Cited

U.S. PATENT DOCUMENTS

| | | |
|---|---|---|
| 2012/0062448 A1 | 3/2012 | Kim et al. |
| 2014/0362329 A1 | 12/2014 | Lee et al. |
| 2016/0209688 A1* | 7/2016 | Kim ................... G06F 3/044 |
| 2016/0259223 A1* | 9/2016 | Bae ................. G02F 1/136286 |

FOREIGN PATENT DOCUMENTS

| | | |
|---|---|---|
| KR | 10-2014-0141364 A | 12/2014 |
| KR | 10-2015-0086821 A | 7/2015 |

* cited by examiner

*Primary Examiner* — Phu Vu
(74) *Attorney, Agent, or Firm* — Innovation Counsel LLP

(57) ABSTRACT

An exemplary embodiment of the present invention provides a liquid crystal display including: a substrate; a thin film transistor disposed on the substrate to be connected to a gate line extending in a first direction and a data line extending in a second direction; a pixel electrode connected to the thin film transistor; a roof layer positioned over the pixel electrode; a liquid crystal layer disposed in a plurality of microcavities formed between the pixel electrode and the roof layer; an inorganic insulating layer disposed to overlap the microcavities; and an overcoat disposed on the roof layer, wherein the inorganic insulating layer includes a first portion overlapping the roof layer and a second portion that does not overlap the roof layer, and a length of the second portion in the second direction is about 20 μm or more.

18 Claims, 11 Drawing Sheets

LIQUID CRYSTAL DISPLAY HAVING IMPROVED CURING CHARACTERISTICS

CROSS-REFERENCE TO RELATED APPLICATION

This application claims priority to, and the benefit of, Korean Patent Application No. 10-2016-0017147 filed in the Korean Intellectual Property Office on Feb. 15, 2016, the entire contents of which are incorporated herein by reference.

BACKGROUND (a) Field

Embodiments of the present invention relate generally to liquid crystal displays. More specifically, embodiments of the present invention relate to liquid crystal displays having improved curing characteristics.

(b) Description of the Related Art

A liquid crystal display, as one widely used type of display device, typically consists of a pair of substrates and a liquid crystal layer interposed between the substrates. By applying voltages to electrodes formed on the two substrates, an electric field is generated in the liquid crystal layer, and alignment of liquid crystal molecules of the liquid crystal layer is determined according to the influence of the generated electric field to display images by controlling the polarization of incident light.

As an example of implementing the liquid crystal display, a technique of forming a plurality of microcavities and depositing a liquid crystal material thereinto to form a liquid crystal layer has been developed.

Two substrates are conventionally employed in a conventional liquid crystal display, but a weight, a thickness, and the like of the display can be reduced by forming a liquid crystal display's constituent elements on one substrate.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention improve reliability of a liquid crystal display by providing an overcoat that does not include a non-cured region.

An exemplary embodiment of the present invention provides a liquid crystal display including: a substrate; a thin film transistor disposed on the substrate to be connected to a gate line extending in a first direction and a data line extending in a second direction; a pixel electrode connected to the thin film transistor; a roof layer positioned over the pixel electrode; a liquid crystal layer disposed in a plurality of microcavities formed between the pixel electrode and the roof layer; an inorganic insulating layer disposed to overlap the microcavities; and an overcoat disposed on the roof layer, wherein the inorganic insulating layer includes a first portion overlapping the roof layer and a second portion that does not overlap the roof layer, and a length of the second portion in the second direction is about 20 μm or more.

The roof layer may comprise a color filter.

The liquid crystal display may further include a light blocking member disposed to overlap the thin film transistor, and the roof layer and the light blocking member may overlap each other in the second direction by about 5 μm or more.

The liquid crystal display may further include a supporting member disposed proximate to an edge of each of the microcavities.

Inlets of microcavities which are adjacent to each other in the second direction may face each other, and the supporting member may be disposed proximate to one of the inlets.

The supporting member may overlap the second portion of the inorganic insulating layer.

The supporting member may overlap the light blocking member.

A length of that part of the second portion which does not overlap the supporting member in the second direction may be at least 10 μm or more.

A material of the supporting member may be the same as that of the inorganic insulating layer.

The inorganic insulating layer may include a first inorganic insulating layer disposed between the liquid crystal layer and the roof layer and a second inorganic insulating layer disposed between the roof layer and the overcoat.

A portion of the microcavities may be exposed by the roof layer.

A boundary between the liquid crystal layer and the overcoat may overlap the second portion.

A portion of the overcoat may overlap the second portion.

An exemplary embodiment of the present invention provides a liquid crystal display including: a substrate; a thin film transistor disposed on the substrate to be connected to a gate line extending in a first direction and a data line extending in a second direction; a pixel electrode connected to the thin film transistor; a roof layer positioned over the pixel electrode; a liquid crystal layer disposed in a plurality of microcavities formed between the pixel electrode and the roof layer; an inorganic insulating layer disposed to overlap the microcavities; and an overcoat disposed on the roof layer, wherein the inorganic insulating layer includes a first portion overlapping the roof layer and a second portion that does not overlap the roof layer, and an interface between the liquid crystal layer and the overcoat overlaps the second portion.

The roof layer may comprise a color filter.

A portion of the overcoat may overlap the second portion.

The liquid crystal display may further include a supporting member disposed proximate to an edge of each of the microcavities.

The supporting member may overlap the second portion.

According to the exemplary embodiment of the present invention, even when the roof layer is formed of a color filer and the interface between the overcoat and the liquid crystal layer is positioned inside of the microcavity, a non-cured region may not be generated in a curing process of the overcoat, thereby improving reliability of the liquid crystal display.

DETAILED DESCRIPTION OF THE EMBODIMENTS

Figure 1:
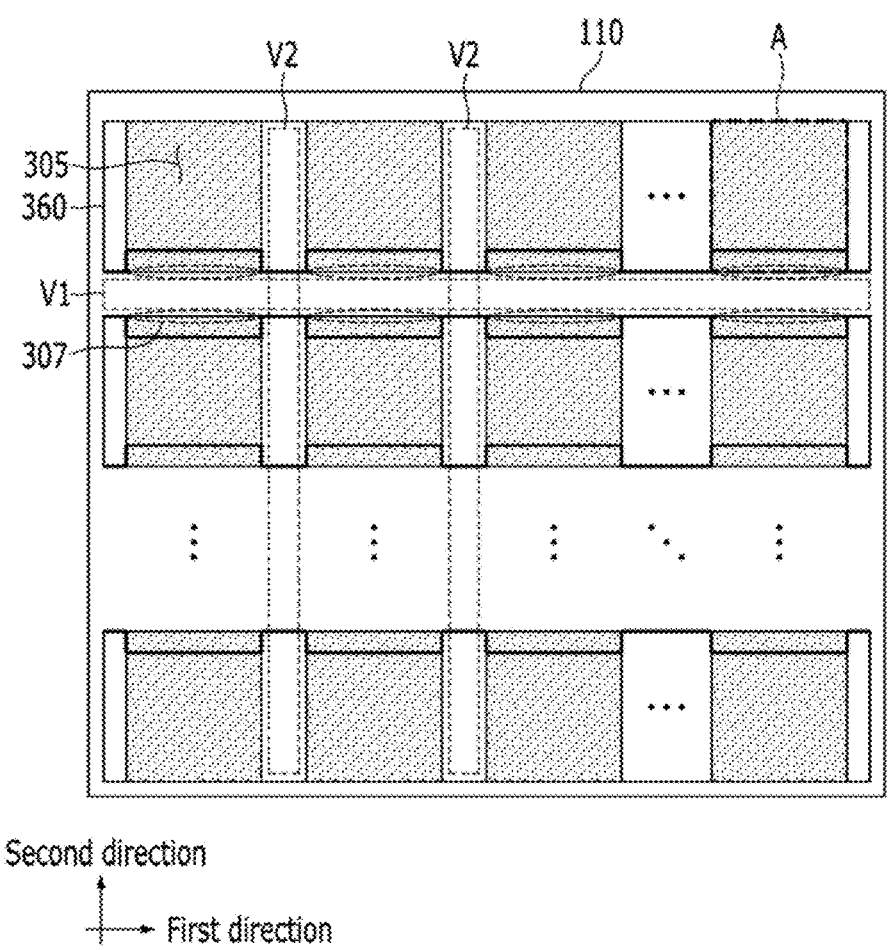
FIG. 1 is a plan view illustrating a liquid crystal display according to an exemplary embodiment of the present invention.

Hereinafter, exemplary embodiments of the present invention will be described in detail with reference to the accompanying drawings. In describing the present invention, a description of known functions or configurations will be omitted so as to make the subject matter of the present invention more clear.

To clearly describe the present invention, portions which do not relate to the description are omitted, and like reference numerals designate like elements throughout the specification. The size and thickness of each component shown in the drawings are arbitrarily shown for better understanding and ease of description, but the present invention is not limited thereto.

In the drawings, the thickness of layers, films, panels, regions, etc., are exaggerated for clarity. For better understanding and ease of description, the thickness of some layers and areas is exaggerated. The various figures are thus not to scale. It will be understood that when an element such as a layer, film, region, or substrate is referred to as being "on" another element, it can be directly on the other element or intervening elements may also be present. In contrast, when an element is referred to as being "directly on" another element, there are no intervening elements present. In the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

All numerical values are approximate, and may vary. All examples of specific materials and compositions are to be taken as nonlimiting and exemplary only. Other suitable materials and compositions may be used instead.

Herein, a first direction and a second direction are perpendicular to each other. For example, the first direction is a row direction in which a gate line extends, and the second direction is a column direction in which a data line extends.

Hereinafter, a liquid crystal display according to an exemplary embodiment of the present invention will be described with reference to FIG. 1. FIG. 1 is a plan view illustrating a liquid crystal display according to an exemplary embodiment of the present invention.

Referring to FIG. 1, a liquid crystal display according to the exemplary embodiment of the present invention includes a plurality of microcavities 305 disposed at positions corresponding to pixel areas that display images on a screen. The microcavities 305 are formed in a manufacturing process, and an alignment material and a liquid crystal material are injected into the microcavities 305 to form an alignment layer and a liquid crystal layer which will be described later. The microcavities 305 may be disposed in a matrix form including a plurality of rows and a plurality of columns. For example, the microcavities 305 may have a quadrangular planar form.

A first region V1 may be disposed between microcavities 305 that are adjacent in the second direction, and a roof layer 360 may not be disposed in, i.e. may be removed from, the first region V1. In this case, an overcoat to be described later may be disposed in the first region V1.

Before the overcoat is formed in the first region V1, the alignment material and/or the liquid crystal material may be injected into the microcavities 305, and an inlet 307 for injecting the alignment material and/or the liquid crystal material may be disposed around boundaries of the microcavities 305.

The inlet 307 may be disposed at opposite edges of each of the microcavities 305. Herein, the opposite edges of the microcavity 305 may be positioned to face each other in a direction in which the second region V2 is extended, i.e., in the second direction.

The roof layer 360 may be formed in the first direction, and may include a partition wall disposed in a second region V2 formed in the second direction. The partition wall serves to partition adjacent microcavities 305 based on the second region V2. The partition wall may be a part of the roof layer 360 that extends toward the substrate 110.

Further, the roof layer 360 may be disposed to overlap the microcavities 305. Referring to FIG. 1, in an area A occupied by a microcavity 305, most parts of the roof layer 360 overlap the microcavities 305, but do not overlap an edge of the microcavity 305. That is, a second direction length of the roof layer 360 may be smaller than a second direction length of the microcavity 305. Accordingly, a plan-view shape of the roof layer 360 may have an uneven form as shown in FIG. 1. This will be described in further detail below.

The aforementioned structure of the liquid crystal display according to an exemplary embodiment of the present invention is merely an example, and numerous variations are possible. For example, shapes of the microcavities 305, the first region V1, and the second region V2 may vary, and a plurality of roof layers 360 may be connected to each other in the first region V1. Further, there may be no partition wall or there may be a partial partition wall in the second region V2, and thus a path through which adjacent microcavities 305 are connected may be formed based on the second region V2.

Figure 2:
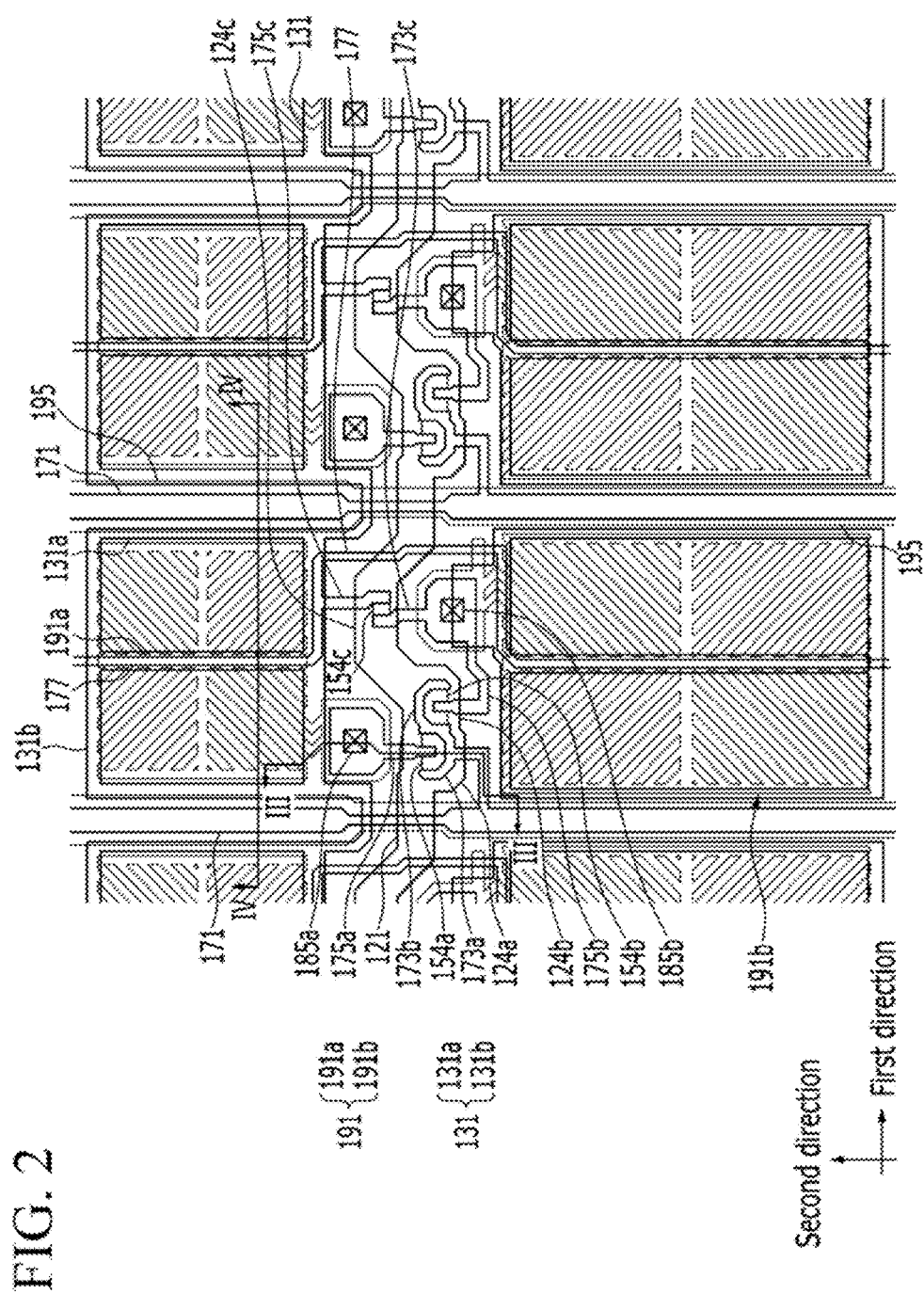
FIG. 2 is a plan view illustrating a pixel area of the liquid crystal display shown in FIG. 1.

Hereinafter, a liquid crystal display according to an exemplary embodiment of the present invention will be described in detail with reference to FIG. 2 to FIG. 4. FIG. 2 is a plan view illustrating a pixel area of the liquid crystal display shown in FIG. 1, FIG. 3 is a cross-sectional view taken along a line III-III of FIG. 2, and FIG. 4 is a cross-sectional view taken along a line IV-IV of FIG. 2.

Figure 3:
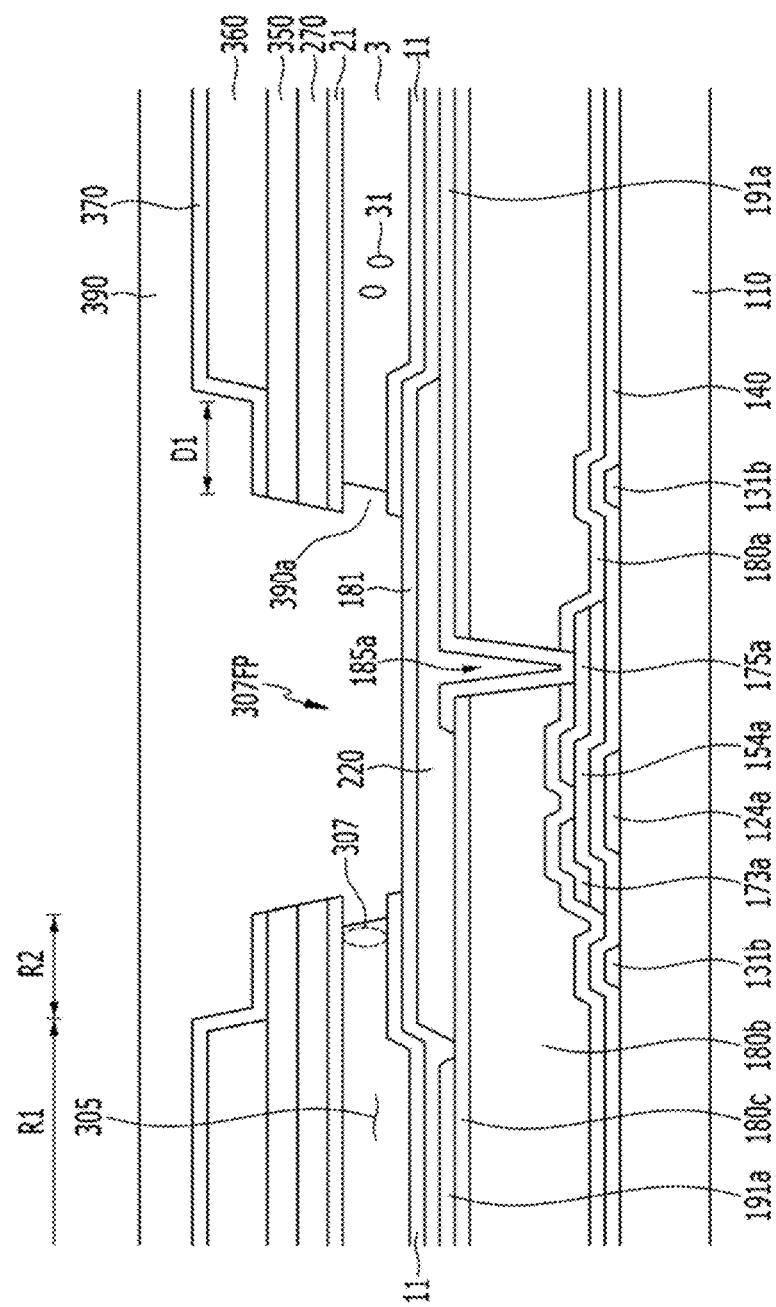
FIG. 3 is a cross-sectional view taken along a line III-III of FIG. 2.
Figure 4:
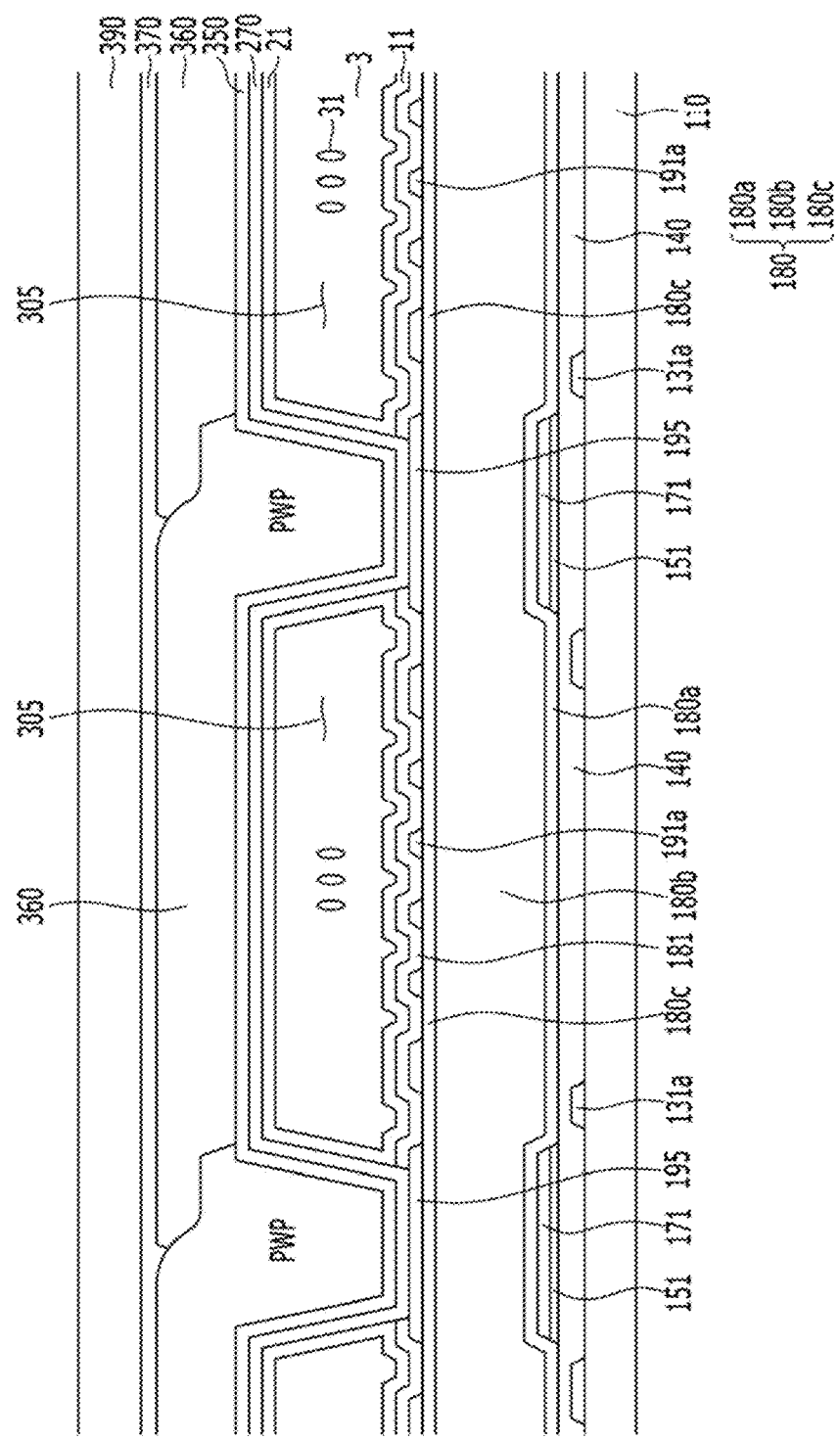
FIG. 4 is a cross-sectional view taken along a line IV-IV of FIG. 2.

Referring to FIG. 2 to FIG. 4, a gate line 121, and a storage electrode line 131 including a first storage electrode line 131a and a second storage electrode line 131b, are disposed on a substrate 110 made of transparent glass, plastic, or the like.

The gate line 121 includes a wide end portion (not shown) for connection with a first gate electrode 124a, a second gate electrode 124b, and a third gate electrode 124c, or an external driving circuit.

The storage electrode line 131 has a structure that surrounds a first subpixel electrode 191*a* and a second subpixel electrode 191*b*, and may receive a specific voltage such as a common voltage. The first storage electrode line 131*a* may be disposed between a pixel electrode 191 and a data line 171 to reduce signal interference therebetween. The second storage electrode line 131*b* may be disposed between the pixel electrode 191 and the gate line 121 to reduce signal interference therebetween.

A gate insulating layer 140 is disposed on the gate line 121, and a first semiconductor layer 154*a*, a second semiconductor layer 154*b*, a third semiconductor layer 154*c*, and a semiconductor stripe layer 151, each of which has a channel region, is disposed on the gate insulating layer 140. The semiconductor stripe layer 151 may be disposed at a lower end of the data line 171.

A plurality of ohmic contacts (not illustrated) disposed on the first semiconductor layer 154*a*, the second semiconductor layer 154*b*, and the third semiconductor layer 154*c* may be further included.

A data conductor including a first source electrode 173*a*, a second source electrode 173*b*, a third source electrode 173*c*, a first drain electrode 175*a*, a second drain electrode 175*b*, a third drain electrode 175*c*, the data line 171 connected with the first source electrode 173*a*, and a reference voltage line 177 connected with the third drain electrode 175*c* is disposed on the first semiconductor layer 154*a*, the second semiconductor layer 154*b*, the third semiconductor layer 154*c*, and the gate insulating layer 140.

A data conductor and a semiconductor layer disposed therebelow may be simultaneously formed by using one mask.

The data line 171 includes a wide end portion (not illustrated) for connection to another layer or an external driving circuit. The data line 171 may serve as a light blocking member.

The reference voltage line 177 may be directly connected to the third drain electrode 175*c*, and may partially overlap the pixel electrode 191. Particularly, the reference voltage line 177 may be disposed to overlap a vertical stem of the pixel electrode 191, thereby preventing an aperture ratio from being reduced.

The first gate electrode 124*a*, the first source electrode 173*a*, and the first drain electrode 175*a* form a first thin film transistor along with the first semiconductor layer 154*a*, and the channel region of the thin film transistor is formed in the portion of the first semiconductor layer 154*a* between the first source electrode 173*a* and the first drain electrode 175*a*. Similarly, the second gate electrode 1241, the second source electrode 173*b*, and the second drain electrode 175*b* form a second thin film transistor along with the second semiconductor 154*b*, and the channel region of the thin film transistor is formed in the portion of the semiconductor portion 154*b* between the second source electrode 173*b* and the second drain electrode 175*b*. Also, the third gate electrode 124*c*, the third source electrode 173*c*, and the third drain electrode 175*c* form a third thin film transistor along with the third semiconductor 154*c*, and the channel region of the thin film transistor is formed in the portion of the semiconductor portion 154*c* between the third source electrode 173*c* and the third drain electrode 175*c*.

A passivation layer 180 is positioned on the data conductor and the semiconductor layers 154*a*, 154*b*, and 154*c*. The passivation layer 180 includes a first passivation layer 180*a*, a second passivation layer 180*b*, and a third passivation layer 180*c*.

The first passivation layer 180*a* may include an inorganic material such as a silicon nitride (SiNx) and a silicon oxide (SiOx). The second passivation layer 180*b* and the third passivation layer 180 may be positioned on the first passivation layer 180*a*. The second passivation layer 180*b* may include an organic material, and the third passivation layer 180*c* may include an inorganic material such as a silicon nitride (SiNx) and a silicon oxide (SiOx). As one example, the second passivation layer 180*b* may be made of an organic material, thereby substantially smoothing its upper surface even over an underlying step. Differently from the present exemplary embodiment one or two among the first passivation layer 180*a*, the second passivation layer 180*b*, and the third passivation layer 180*c* may be omitted.

A first contact hole 185*a* for connecting the first drain electrode 175*a* with the first subpixel electrode 191*a*, and a second contact hole 185*b* for connecting the second drain electrode 175*b* with the second subpixel electrode 191*b*, are formed in the passivation layer 180.

The pixel electrode 191, including the first sub-pixel electrode 191*a* and the second sub-pixel electrode 191*b*, is positioned on the passivation layer 180. The pixel electrode 191 may be made of a transparent conductive material such as ITO or IZO.

A shielding electrode 195 is disposed on a region overlapping the data line 171 on the passivation layer 180.

The shielding electrode 195 may be formed of a same material as the pixel electrode 191, and may formed on a same layer as that of the pixel electrode 191 through a same process. The shielding electrode 195 may be omitted according to another exemplary embodiment.

The first subpixel electrode 191*a* and the second subpixel electrode 191*b* may 10*i* be adjacent to each other along the second direction, and the collective shape thereof may be of a quadrangle. Each of the first subpixel electrode 191*a* and the second subpixel electrode 191*b* includes a cross-shaped stem including a vertical stem portion and a horizontal stem portion crossing the vertical stem portion. Further, each of the first subpixel electrode 191*a* and the second subpixel electrode 191*b* is divided into four sub-regions by the horizontal stem portion and the vertical stem portion, and each of the sub-regions includes a plurality of minute branches.

The first subpixel electrode 191*a* and the second subpixel electrode 191*b* are physically and electrically connected to the first drain electrode 175*a* and the second drain electrode 175*b* through the contact holes 185*a* and 185*b* respectively, and receive data voltages from the first drain electrode 175*a* and the second drain electrode 175*b*. In this instance, part of the data voltage supplied to the second drain electrode 175*b* is divided through the third source electrode 173*c*, so that the voltage supplied to the second subpixel electrode 191*b* becomes smaller than the voltage supplied to the first subpixel electrode 191*a*.

The description of the above-described thin film transistor and the pixel electrode 191 is only one example, and the structure of the thin film transistor and the design of the pixel electrode may be changed to improve lateral visibility.

A light blocking member 220 covers the region in which the thin film transistor is formed, and is positioned on the pixel electrode 191. The light blocking member 220 according to the present exemplary embodiment may extend along the direction in which the gate line 121 extends. The light blocking member 220 may be formed of a light blocking material.

A fourth passivation layer 181 may be positioned on the light blocking member 220, and the fourth passivation layer 181 may cover the light blocking member 220 and extend over the pixel electrode 191. The fourth passivation layer 181 will be omitted according to another exemplary embodiment.

A first alignment layer 11 is formed on the pixel electrode 191, and the first alignment layer 11 may be a vertical alignment layer. The first alignment layer 11, which is a liquid crystal alignment layer and includes a material such as polyamic acid, polysiloxane, or polyimide, may be formed of any one among generally-used materials. Further, the first alignment layer 11 may be a photo-alignment layer in an exemplary embodiment in which liquid crystal molecules 31 are to be horizontally aligned.

A second alignment layer 21 is disposed to face the first alignment layer 11, and the microcavity 305 is formed between the first alignment layer 11 and the second alignment layer 21. The first alignment layer 11 and the second alignment layer 21 have been described independently depending on upper and lower position based on the microcavity 305.

A liquid crystal material including a plurality of liquid crystal molecules 31 is injected into the microcavities 305, using the inlets 307 disposed at opposite edges of each microcavity 305. Each inlet 307 is disposed at a boundary between a liquid crystal layer 3 and a trench region 307FP covered with an overcoat 390 to be described later. An alignment material and/or a liquid crystal material may be injected into each microcavity 305 through its inlets 307. In the present exemplary embodiment, the alignment material used to form an alignment layer, and the liquid crystal material including the liquid crystal molecules 31, may be injected into each microcavity 305 by using capillary force.

The microcavities 305 are divided into a plurality of microcavities 305 laid out successively along the second direction, by the trench region 307FP disposed to overlap the gate line 121. Further, the microcavities 305 are divided into a plurality of microcavities 305 extending along the first direction, by a partition wall PWP. Each of the microcavities 305 may correspond to one or more pixel areas, and the pixel areas may correspond to a region for displaying images on a screen.

A common electrode 270 is disposed on the second alignment layer 21. The common electrode 270 receives a common voltage, and generates an electric field together with a pixel electrode 191 which receives a data voltage. This electric field determines a direction in which the liquid crystal molecules 31 disposed in the microcavities 305 between the two electrodes are inclined. The common electrode 270 and the pixel electrode 191 constitute a capacitor so as to maintain a voltage even after a thin film transistor is turned off.

In the present exemplary embodiment, it has been described that the common electrode 270 is formed at an upper end portion of the microcavities 305. However, according to another exemplary embodiment, the common electrode 270 may be formed below the microcavities 305 to drive a liquid crystal, such as in a coplanar electrode (CE) mode.

A first inorganic insulating layer 350 is disposed on the common electrode 270. The first inorganic insulating layer 350 may be formed of a silicon nitride (SiNx) or a silicon oxide (SiOx).

The roof layer 360 is disposed on the first inorganic insulating layer 350. In the present exemplary embodiment, the roof layer 360 may be formed as a color filter. As shown in FIG. 4, the partition wall PWP may be formed as a color filter having a particular color. The partition wall PWP is disposed between microcavities 305 that are adjacent to each other along the first direction. The partition wall PWP serves to fill a gap between such adjacent microcavities 305. Each partition wall PWP may extend in the second direction in which the data line 171 is extended.

The roof layer 360 may be formed of a plurality of color filters, and may have a structure in which the color filters overlap each other on the partition wall PWP. Interfaces between adjacent color filters may be positioned to correspond to the partition wall PWP.

In the present exemplary embodiment, the roof layer 360 is formed of color filters, and serves to support the microcavities 305 such that the microcavities 305 maintain their shapes.

A part of the roof layer 360 may overlap the light blocking member 220 by at least about 5 μm in the second direction, as shown in FIG. 3. This is to block a light leakage phenomenon caused by misalignment which may occur in the manufacturing process.

A second inorganic insulating layer 370 is disposed on the roof layer 360. Similar to the first inorganic insulating layer 350, the second inorganic insulating layer 370 may be formed of a silicon nitride (SiNx) or a silicon oxide (SiOx).

An overcoat 390 is disposed on the second inorganic insulating layer 370. The overcoat 390 is also disposed on the trench region 307FP to cover the inlets 307. The overcoat 390 may include an organic material or an inorganic material.

According to the exemplary embodiment of the present invention, a boundary between the overcoat 390 and the liquid crystal layer 3 may be formed within the microcavity 305. In other words, the overcoat 390 disposed in the trench region 307FP may be formed to extend inside of the microcavity 305. In this case, the boundary between the overcoat 390 and the liquid crystal layer 3 may be positioned to overlap a second portion R2 extending beyond the roof layer 360.

According to an exemplary embodiment of the present invention, the first inorganic insulating layer 350 and the second inorganic insulating layer 370 may be collectively referred to as the inorganic insulating layers 350 and 370, and may include a first portion R1 positioned to overlap the roof layer 360 and the second portion R2 other than the first portion R1. In other words, the second portion R2 may overlap the inorganic insulating layers 350 and 370 but not the roof layer 360.

A length D1 of the second portion R2 measured in the second direction may be about 20 μm or more. When UV is irradiated to cure the overcoat 390, the roof layer 360 does not overlap an overcoat boundary portion 390a disposed to correspond to the second portion R2, and thus the overcoat boundary portion 390a receives sufficient UV to be cured.

In the case that the roof layer 360 is formed of a color filter, when the roof layer 360 overlaps an edge of the microcavity 305 as in the conventional art, the overcoat boundary portion 390a disposed inside of the microcavity 305 may not be cured. This is because light irradiated to cure the overcoat 390 is absorbed by the roof layer 360, and thus the overcoat boundary portion 390a disposed in the periphery of the inlet 307 is not cured.

In other words, when the interface between the liquid crystal layer 3 and the overcoat 390 is positioned inside of the microcavity 305, a wavelength of light for curing the overcoat 390 is absorbed by the roof layer 360, and thus the overcoat 390 which overlaps the roof layer 360 is likely to include a non-cured portion.

However, according to the exemplary embodiment of the present invention, the roof layer 360 may be moved back so that it does not overlap an edge of the microcavity 305, and the edge of the roof layer 360 is also positioned so that it does not cover a boundary between the liquid crystal layer 3 and the overcoat boundary portion 390a. Accordingly, the boundary between the liquid crystal layer 3 and the overcoat boundary portion 390a is prevented from being covered with the roof layer 360 and not being cured.

In a process of forming the overcoat 390, the boundary between the liquid crystal layer 3 and the overcoat 390 illustrated in FIG. 3 may be disposed to overlap the second portion R2. The boundary between the liquid crystal layer 3 and the overcoat 390 does not overlap the roof layer 360. Therefore, according to the exemplary embodiment of the present invention, the overcoat 390 can be entirely cured by irradiated light without including a non-cured portion, thereby improving reliability of the liquid crystal display.

Figure 5:
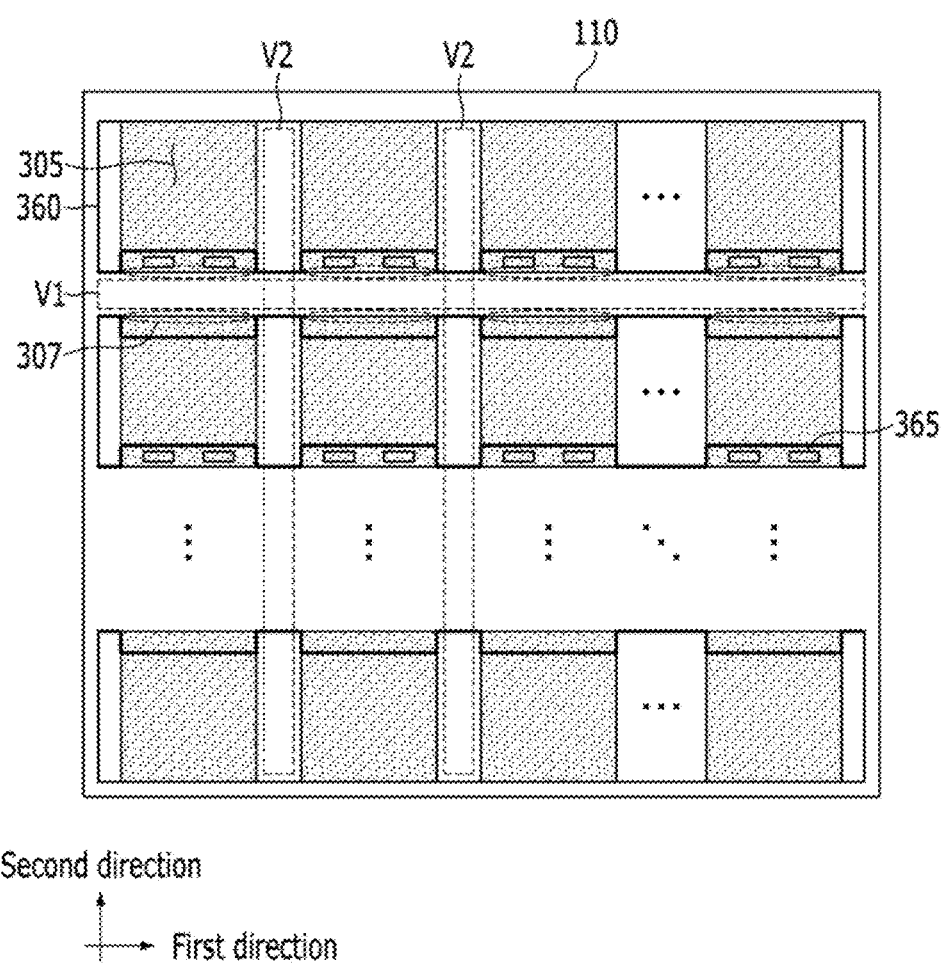
FIG. 5 is a schematic plan view illustrating a liquid crystal display according to a modified exemplary embodiment of FIG. 1.
Figure 6:
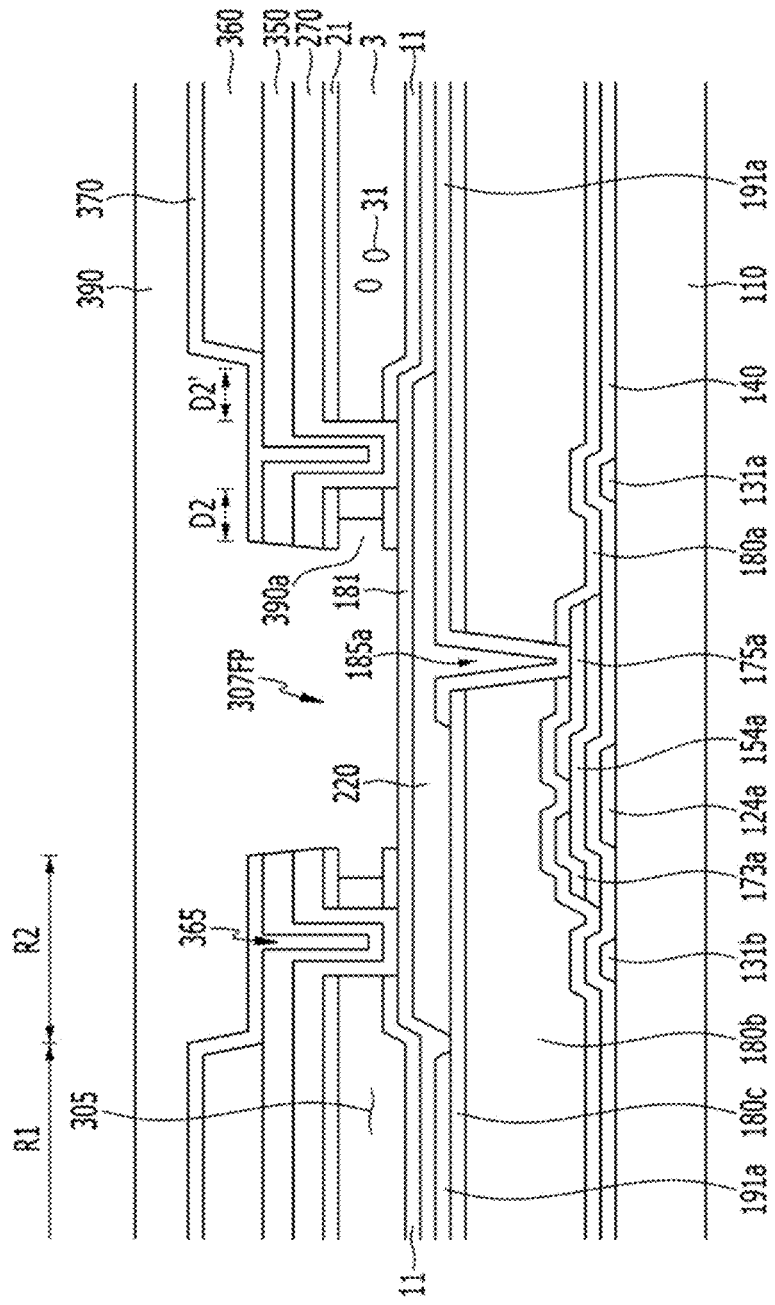
FIG. 6 is a partial cross-sectional view illustrating a liquid crystal display according to a modified exemplary embodiment of FIG. 3.

Hereinafter, a liquid crystal display according to a modified exemplary embodiment will be described with reference to FIG. 5 and FIG. 6. FIG. 5 is a schematic plan view illustrating a liquid crystal display according to a modified exemplary embodiment of FIG. 1, and FIG. 6 is a partial cross-sectional view illustrating a liquid crystal display according to a modified exemplary embodiment of FIG. 3. Redundant description of the same or similar constituent elements as the above-described constituent elements will be omitted.

The liquid crystal display of FIG. 5 or FIG. 6 may further include a supporting member 365 disposed adjacent to the inlet 307 to support the roof layer 360. As a result, it is possible to prevent a sagging phenomenon of the roof layer 360 around the inlet 307.

A plurality of supporting members 365, e.g., two or three supporting members 365, may be formed at an edge of one microcavity 305, and the number of supporting members 365 may be adjusted depending on the size of the microcavity 305. A plan-view shape of the supporting member 365 has been illustrated to be of a substantially quadrangular form, but it is not limited thereto. For example, in plan view, the supporting member 365 may be formed to have various shapes such as circular or polygonal configurations.

The supporting member 365 may be disposed in at least one of opposite edges of two microcavities 305 adjacent to each other in the second direction. For example, a lower-side edge of a microcavity 305 in a first row is positioned to face an upper-side edge of a microcavity 305 in a second row. In this case, the supporting member 365 may be disposed in at least one of the lower-side edge of the first-row microcavity 305 and the upper-side edge of the second-row microcavity 305 which face each other.

The first alignment layer 11 and the second alignment layer 21 may be formed by injecting an aligning agent obtained by dissolving an alignment material in a solvent. In a drying operation of the aligning agent, an aggregation of solid contents tends to occur at a particular location. This aggregation of solids may lead to light leakage, transmittance deterioration, or the like, thereby deteriorating display quality.

In the embodiment of FIG. 5, supporting members 365 are adjacent to only half of the inlets 307. Thus, capillary forces of the inlets 307 formed in one microcavity 305 may be different from each other. Specifically, since the capillary force of the inlet 307 in which the supporting member 365 is disposed is relatively large, alignment layer aggregation is generated around the inlet 307 in which the supporting member 365 is disposed.

However, as shown in FIG. 6, the supporting member 365 and the light blocking member 220 are disposed to overlap each other, and thus it is possible to prevent the alignment layer aggregation defect from being seen. In other words, according to the exemplary embodiment of the present invention, the supporting member 365 is formed close to the edge of the inlet 307, and thus any alignment layer aggregation may occur beyond the edge of each pixel PX. As a result, it is possible to further reduce an area for forming the light blocking member 220, thereby increasing the aperture ratio.

Further, a sagging phenomenon of the inorganic insulating layers 350 and 370 may occur in an area in which alignment layer aggregation occurs. However, the liquid crystal display according to the exemplary embodiment of the present invention includes one or more supporting members 365 disposed in the inlet 307. In addition to inducing alignment layer aggregation at their location, the supporting members 365 support the second portion R2 of the inorganic insulating layers 350 and 370. Accordingly, the roof layer 360 can be prevented from sagging or being deformed.

Meanwhile, the first inorganic insulating layer 350 may be disposed on the common electrode 270. The first inorganic insulating layer 350 may formed of a silicon nitride (SiNx) or a silicon oxide (SiOx).

The roof layer 360 is disposed on the first inorganic insulating layer 350. In the exemplary embodiment of FIG. 5 and FIG. 6, the roof layer 360 may be formed of a color filter. The roof layer 360 serves to support the microcavity 305 to maintain its shape.

A part of the roof layer 360 may overlap the light blocking member 220 by at least about 5 μm in the second direction, as shown in FIG. 6. This is to block a light leakage phenomenon caused by alignment errors which occur in the manufacturing process.

The second inorganic insulating layer 370 is disposed on the roof layer 360. The second inorganic insulating layer 370 may be formed of a silicon nitride (SiNx) or a silicon oxide (SiOx).

The overcoat 390 is disposed on the second inorganic insulating layer 370. The overcoat 390 is also disposed on the trench region 307FP to cover the inlets 307. The overcoat 390 may include an organic material or an inorganic material. Herein, it is illustrated that the liquid crystal material is removed in the trench region 307FP, but the liquid crystal material remaining after being injected into the microcavity 305 may exist in the trench region 307FP.

According to the exemplary embodiment of the present invention, the first inorganic insulating layer 350 and the second inorganic insulating layer 370 may be collectively referred to as the inorganic insulating layers 350 and 370, and may include the first portion R1 positioned to overlap the roof layer 360 and the second portion R2 other than the first portion R1. In this case, the length D1 of the second portion R2 measured in the second direction may be about 20 μm or more.

According to the exemplary embodiment of the present invention, the second portion R2 may overlap the supporting member 365. As a result, the supporting member 365 may not overlap the roof layer 360 but may overlap the first inorganic insulating layer 350 and the second inorganic insulating layer 370.

Further, a length (D2+D2'), which measures the length of that part of R2 which does not overlap the supporting member 365, may be at least 10 μm or more. In the second portion R2, lengths D2 and D2' are each preferably at least 5 µm. This is to block a light leakage phenomenon caused by alignment errors which may occur in the manufacturing process. As a result, a length of that portion of the second portion R2 which does not overlap the supporting member 365 may be at least 10 µm.

Meantime, the supporting member 365 may be formed by extending the first inorganic insulating layer 350 and the second inorganic insulating layer 370 toward the substrate 110. That is, of the supporting member 365 is made up of the inorganic insulating layers 350 and 370. As a result, the supporting member 365 and the inorganic insulating layers 350 and 370 may be formed of a same material by using a same process.

The supporting member 365 may not overlap, i.e. may be spaced apart from, the roof layer 360 in plan view. The supporting member 365 is disposed to overlap the second portion R2 which does not overlap the roof layer 360, and thus the supporting member 365 does not overlap the roof layer 360.

As in the exemplary embodiment of the present invention, a boundary of the roof layer 360 is recessed away from a boundary between the liquid crystal layer 3 and the overcoat 390. Accordingly, the roof layer 360 does not prevent curing of any part of the overcoat 390.

According to the manufacturing process, in a process of forming the overcoat 390, the boundary between the liquid crystal layer 3 and the overcoat 390 illustrated in FIG. 6 may be disposed to overlap the second portion R2. As a result, the overcoat boundary portion 390a does not overlap the roof layer 360. Therefore, according to the exemplary embodiment of the present invention, the overcoat 390 can be entirely cured by irradiated light without a non-cured portion, thereby improving reliability of the liquid crystal display.

Figure 7:
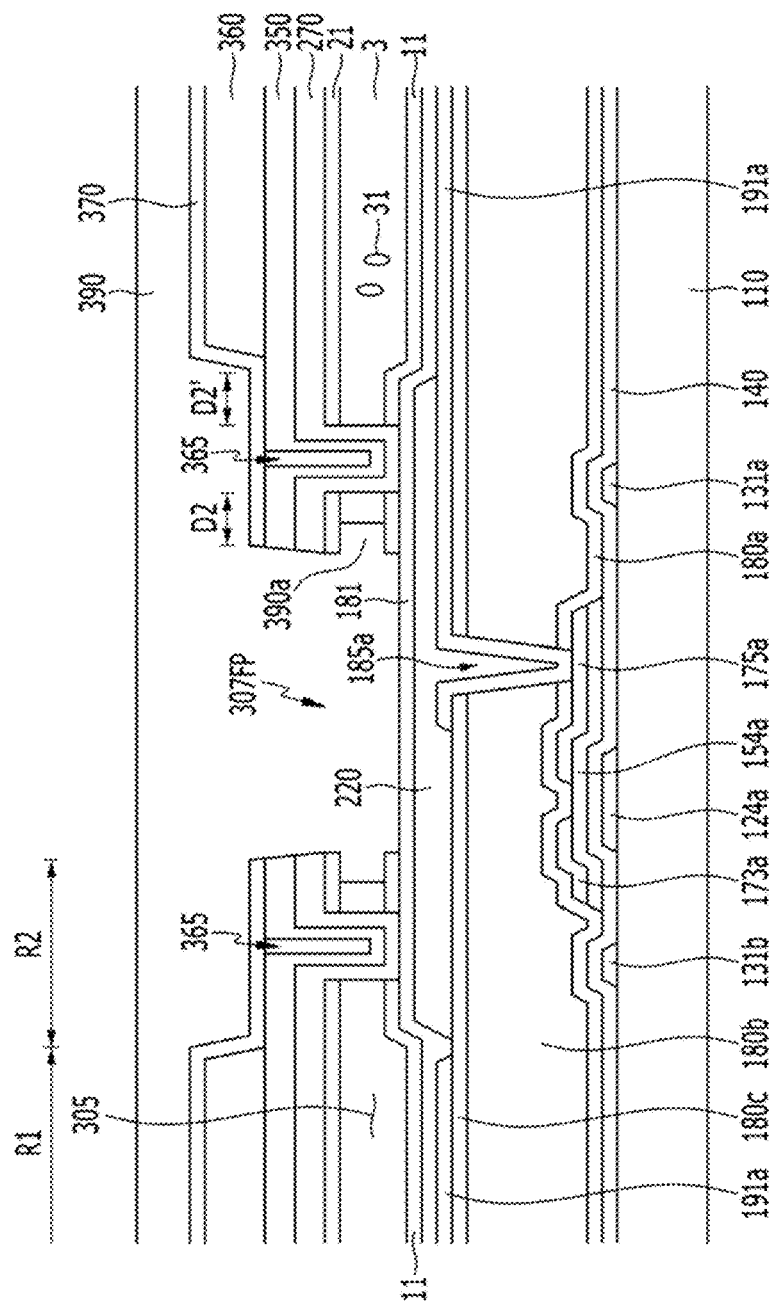
FIG. 7 is a partial cross-sectional view illustrating a liquid crystal display according to a modified exemplary embodiment of FIG. 6.

Hereinafter, a liquid crystal display according to a modified exemplary embodiment will be described with reference to FIG. 7. FIG. 7 is a partial cross-sectional view illustrating a liquid crystal display according to a modified exemplary embodiment of FIG. 6. Repetitive description of the same or similar constituent elements as the above-described constituent elements will be omitted.

According to the exemplary embodiment of FIG. 7, the liquid crystal display includes a supporting member 365 formed of an organic material. That is, differently from the exemplary embodiment, the supporting member 365 may be formed by using a low temperature organic film material. The low temperature organic film material may be a low temperature organic film material formed in a strip manufacturing process.

Figure 8:
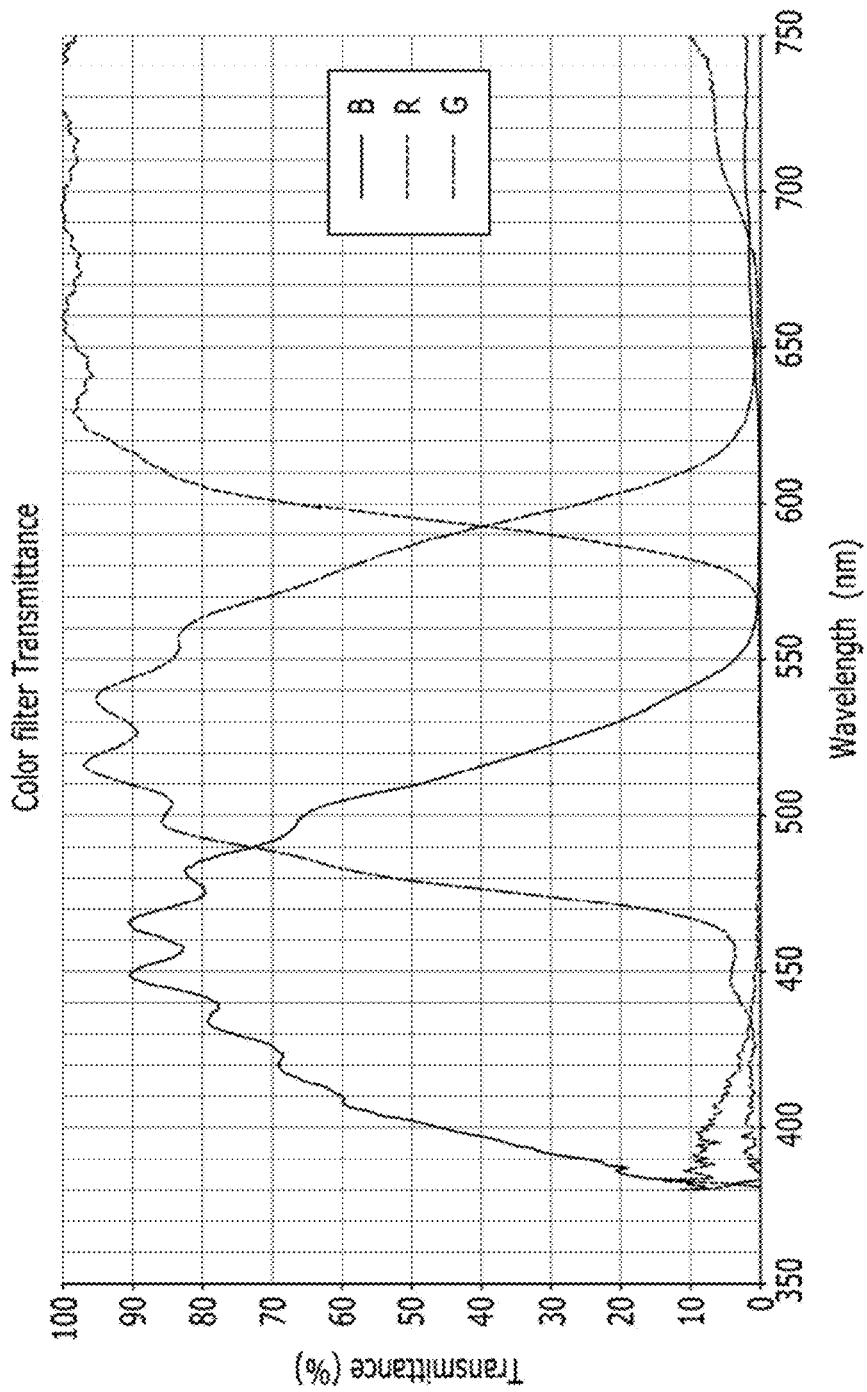
FIG. 8 is a graph illustrating transmittance as a function of wavelength for each color filter.
Figure 9:
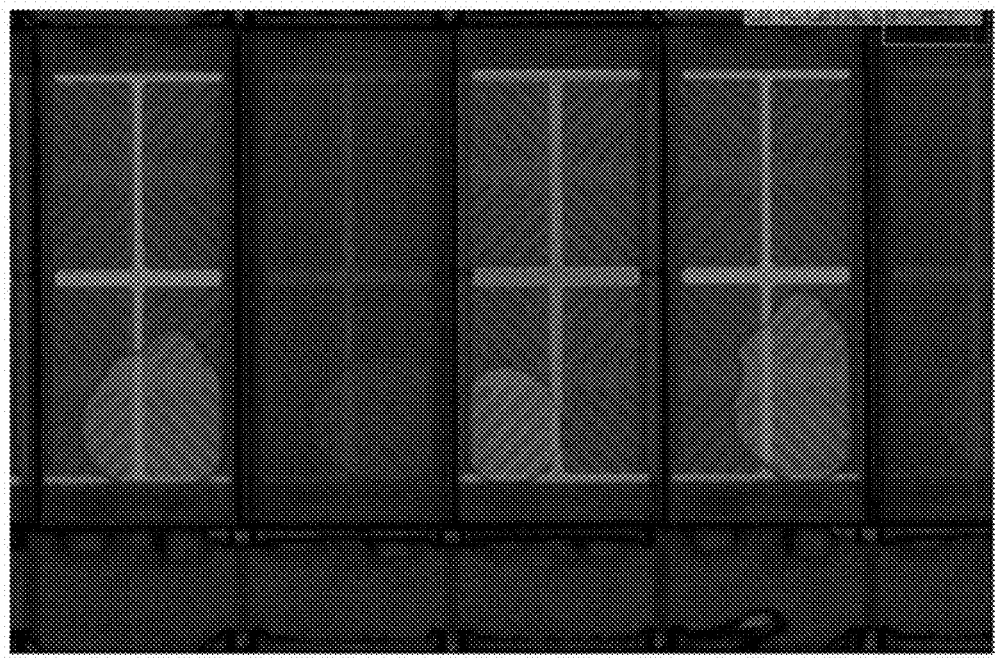
FIG. 9 and FIG. 10 illustrate images of a liquid crystal display including a non-cured overcoat.
Figure 10:
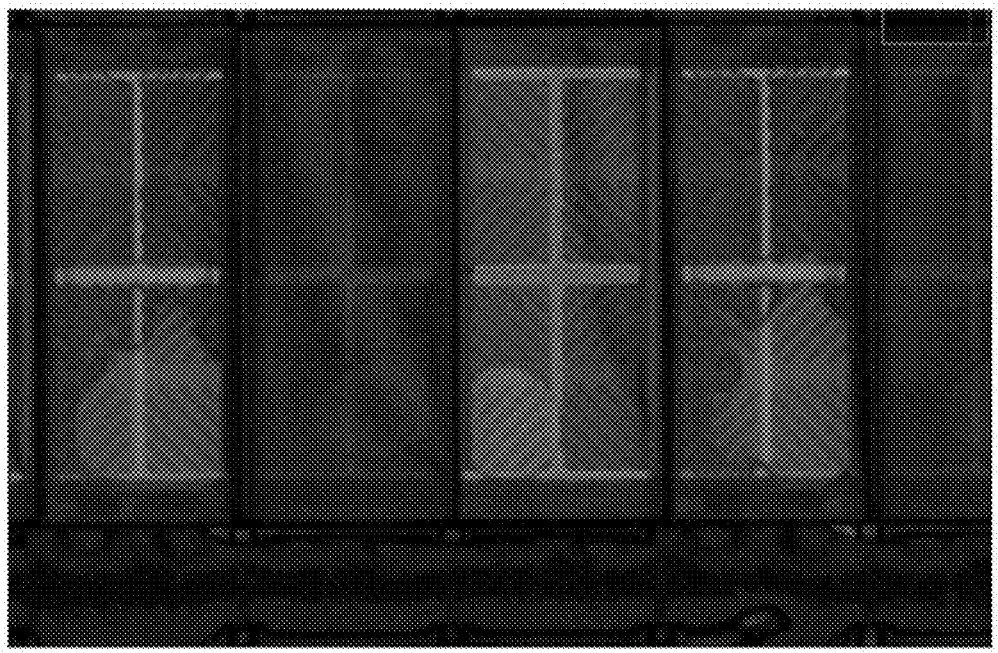
Figure 11:
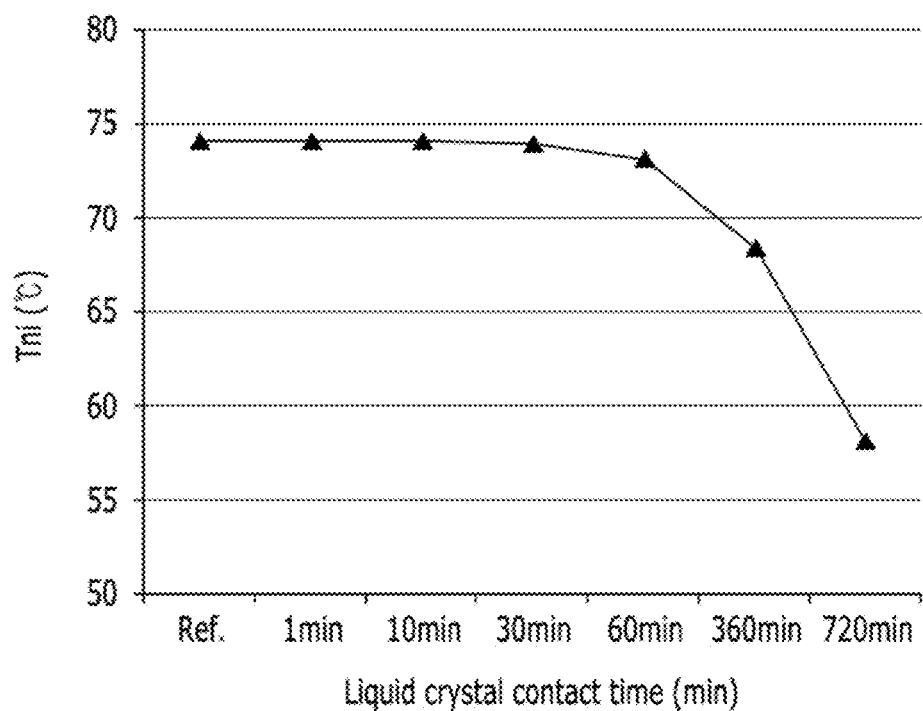
FIG. 11 is a graph illustrating a phase transition temperature Tni as a function of a contact time of an overcoat and a liquid crystal layer.

Hereinafter, effects expected according to the exemplary embodiment of the present invention will be described with reference to FIG. 8 to FIG. 11. FIG. 8 is a graph illustrating transmittance as a function of wavelength for each color filter, FIG. 9 and FIG. 10 illustrate images of a liquid crystal display including a non-cured overcoat, and FIG. 11 is a graph illustrating a phase transition temperature Tni as a function of contact time of an overcoat and a liquid crystal layer.

Wavelength variations of red, green, and blue color filters will be described. A UV wavelength used for a curing process of an overcoat is in a range of 350 nm to 400 nm, and referring to FIG. 8, light wavelength absorption of each color filter is 90% or more at a corresponding wavelength. As a result, it is seen that most parts of the light wavelength are absorbed. Particularly, it is seen that the green color filter has high light wavelength absorption.

Accordingly, when the roof layer is formed of a color filter, it is difficult to cure an overcoat disposed near the inlet to overlap the roof layer. Specifically, a boundary between the liquid crystal layer and the overcoat is positioned inside of the microcavity, a wavelength of light for curing the overcoat is absorbed by the roof layer, and thus it is difficult to sufficiently cure a boundary portion of the overcoat such that it is likely to include a non-cured portion. This partially uncured overcoat causes deterioration of reliability of the liquid crystal display.

However, as in the exemplary embodiment of the present invention, the boundary of the roof layer is recessed in from the boundary between the liquid crystal layer and the overcoat, and thus it is easy to cure the overcoat disposed at the boundary of the liquid crystal layer. Therefore, according to the exemplary embodiment of the present invention, the overcoat may not include a non-cured portion.

FIG. 9 illustrates an image of a display device in which a microcavity is cured by coating an overcoat thereon, and FIG. 10 illustrates an image of the display device of FIG. 9 observed by dripping acetone thereon. In this case, it is seen that a bubble region illustrated in FIG. 10 is different from a bubble region illustrated in FIG. 9. This indicates penetration of the acetone into the microcavity along the non-cured overcoat. That is, when the boundary of the liquid crystal layer lies within the boundary of the roof layer, that indicates the overcoat may include a non-cured portion.

FIG. 11 is a graph illustrating a liquid crystal display in which an overcoat includes a non-cured portion due to an overlapping roof layer formed of a color filter, according to a comparative example. In this case, as a duration during which an overcoat including a non-cured portion contacts the liquid crystal layer increases, it is seen that a phase transition temperature, which is one of major physical properties of the liquid crystal, sharply deteriorates.

As described with reference to FIG. 8 to FIG. 11, when the roof layer is formed of a color filter and the roof layer covers a boundary between the liquid crystal layer and the overcoat, i.e., when the boundary of the liquid crystal layer is formed inside of the microcavity and under the roof layer, a non-cured portion of the overcoat is generated. Accordingly, the liquid crystal layer contacting the overcoat is likely to be contaminated, and the physical property of the liquid crystal is changed as time passes. This causes reliability of the panel to deteriorate.

However, according to the exemplary embodiment of the present invention, when the color-filter roof layer is formed so that it does not cover the overcoat, i.e., when the boundary of the roof layer is recessed in from a boundary between the liquid crystal layer and the overcoat, the overcoat disposed close to the inlet does not include a non-cured portion. Accordingly, since the liquid crystal layer contacting the overcoat is not contaminated, it is possible to provide a panel capable of having improved reliability.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Various features of the above described and other embodiments can be mixed and matched in any manner, to produce further embodiments consistent with the invention.

DESCRIPTION OF SYMBOLS

110: substrate
121: gate line

171: data line
220: light blocking member
191: pixel electrode
360: roof layer
390: overcoat

What is claimed is:

1. A liquid crystal display comprising:
a substrate;
a thin film transistor disposed on the substrate to be connected to a gate line extending in a first direction and a data line extending in a second direction;
a pixel electrode connected to the thin film transistor;
a roof layer positioned over the pixel electrode;
a liquid crystal layer disposed in a plurality of microcavities formed between the pixel electrode and the roof layer;
an inorganic insulating layer disposed to overlap the microcavities; and
an overcoat disposed on the roof layer,
wherein the inorganic insulating layer includes a first portion overlapping the roof layer and a second portion that does not overlap the roof layer, and
a length of the second portion in the second direction is about 20 µm or more.

2. The liquid crystal display of claim 1, wherein the roof layer comprises a color filter.

3. The liquid crystal display of claim 1, further comprising:
a light blocking member disposed to overlap the thin film transistor,
wherein the roof layer and the light blocking member overlap each other in the second direction by about 5 µm or more.

4. The liquid crystal display of claim 1, further comprising:
a supporting member disposed proximate to an edge of each of the microcavities.

5. The liquid crystal display of claim 4, wherein:
inlets of microcavities which are adjacent to each other in the second direction face each other, and
the supporting member is disposed proximate to one of the inlets.

6. The liquid crystal display of claim 4, wherein the supporting member overlaps the second portion of the inorganic insulating layer.

7. The liquid crystal display of claim 6, wherein the supporting member overlaps the light blocking member.

8. The liquid crystal display of claim 6, wherein a length of that part of the second portion which does not overlap the supporting member in the second direction is at least 10 µm or more.

9. The liquid crystal display of claim 6, wherein a material of the supporting member is the same as that of the inorganic insulating layer.

10. The liquid crystal display of claim 1, wherein the inorganic insulating layer includes a first inorganic insulating layer disposed between the liquid crystal layer and the roof layer, and a second inorganic insulating layer disposed between the roof layer and the overcoat.

11. The liquid crystal display of claim 1, wherein a portion of the microcavities is exposed by the roof layer.

12. The liquid crystal display of claim 1, wherein a boundary between the liquid crystal layer and the overcoat overlaps the second portion.

13. The liquid crystal display of claim 12, wherein a portion of the overcoat overlaps the second portion.

14. A liquid crystal display comprising:
a substrate;
a thin film transistor disposed on the substrate to be connected to a gate line extending in a first direction and a data line extending in a second direction;
a pixel electrode connected to the thin film transistor;
a roof layer positioned over the pixel electrode;
a liquid crystal layer disposed in a plurality of microcavities formed between the pixel electrode and the roof layer;
an inorganic insulating layer disposed to overlap the microcavities; and
an overcoat disposed on the roof layer,
wherein the inorganic insulating layer includes a first portion overlapping the roof layer and a second portion that does not overlap the roof layer, and
an interface between the liquid crystal layer and the overcoat overlaps the second portion.

15. The liquid crystal display of claim 14, wherein the roof layer comprises a color filter.

16. The liquid crystal display of claim 14, wherein a portion of the overcoat overlaps the second portion.

17. The liquid crystal display of claim 14, wherein further comprising:
a supporting member disposed proximate to an edge of each of the microcavities.

18. The liquid crystal display of claim 17, wherein the supporting member overlaps the second portion.

* * * * *